Figure 1:
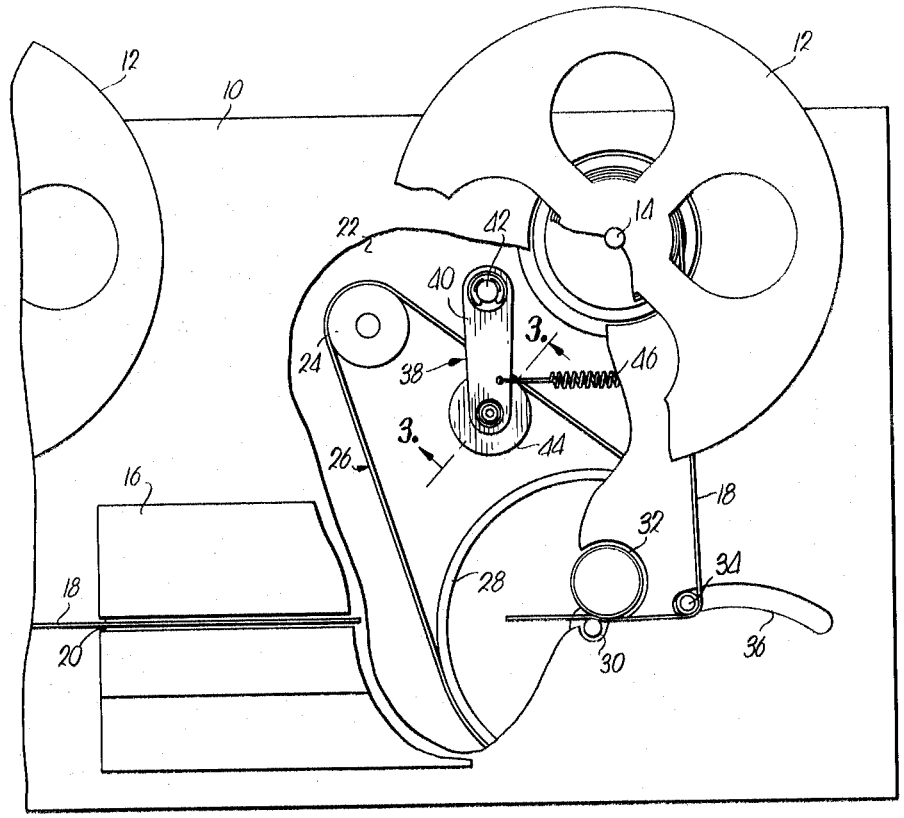

May 17, 1966   H. R. CEDERBERG ETAL   3,251,235
BELT BIAS COMPENSATOR FOR MAGNETIC TAPE DRIVE
Filed Jan. 27, 1964

INVENTORS.
Howard R. Cederberg
William C. Bortzfield
BY
Hovey, Schmidt, Johnson & Hovey
ATTORNEYS

3,251,235
BELT BIAS COMPENSATOR FOR MAGNETIC TAPE DRIVE

Howard R. Cederberg and William C. Bortzfield, Tulsa, Okla., assignors to Midwestern Instruments, Inc., Tulsa, Okla., a corporation of Delaware
Filed Jan. 27, 1964, Ser. No. 340,461
3 Claims. (Cl. 74—240)

This invention relates to a device for use with a belt and pulley drive assembly for preventing creepage of the belt axially along the pulleys and, specifically, to such a device for use in compensating for the bias of a flat belt employed in magnetic tape drive apparatus.

In tape transports and tape recorders for professional use, every effort is made to assure that the magnetic tape will be driven at precisely the desired speed. In tape transport apparatus of the type where the tape is sandwiched between a rotating capstan and a pressure roller, the drive for the capstan is frequently supplied by a belt and pulley assembly. Manifestly, belt slippage or flexing must be eliminated if the speed of rotation of the capstan is to be correctly maintained.

A flat, longitudinally unattenuatable belt provides the ideal linkage between the drive pulley and the driven pulley or capstan flywheel. A belt of this type is commercially available and may be cut to any desired length to a high degree of accuracy. However, the flat belt presents the disadvantage in that it is nearly always cut with some degree of bias. Regardless of manufacturing controls, this bias or angularity will be present and must be compensated for by the drive apparatus.

To explain more fully, when a bias cut belt is engaged with a pair of rotating pulleys, the belt tends to slide axially along the pulleys and will eventually become disengaged therefrom. This creepage of the belt can be eliminated by shimming the drive motor to, in turn, cant the drive pulley and thus disturb the normally parallel relationship of the axes of the drive and driven pulleys. Alternatively, crowning of the pulleys or shifting of the axis of the driven pulley may also be effected to correct the creepage. However, it is evident that either of these methods presents disadvantages, shifting of the axis of the drive or driven pulley being especially undesirable since readjustment is nearly always required when the belt is replaced.

It is, therefore, the primary object of this invention to provide a convenient and readily adjustable means of compensating for the bias of a flat belt employed in belt and pulley drive assemblies.

Another important object of this invention is to provide an idler roller for a belt and pulley drive assembly having an axis of rotation that may be shifted to impart a slight twisting force to the belt to compensate for any angularity thereof tending to force the belt to slide axially along the pulleys.

Still another object of this invention is to provide an adjustable idler roller as aforesaid especially for use with the belt and pulley drive of a tape transport.

Yet another object of this invention is to provide an adjustable idler roller for a belt and pulley drive assembly that serves to both tighten the belt and compensate for any bias thereof while simultaneously providing a means for adjusting the disposition of the roller during operation of the drive apparatus.

It is still a further object of this invention to provide an adjustable idler roller as aforesaid having a tiltable axle for imparting a twisting force to the belt to compensate for the bias of the latter.

Other objects will become apparent as the detailed description proceeds.

Figure 2:
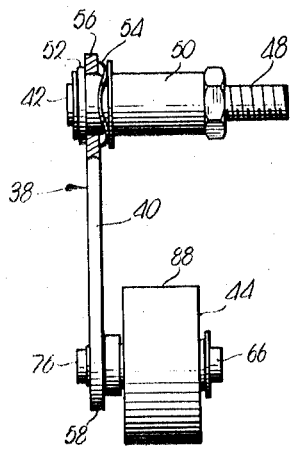
Figure 3:
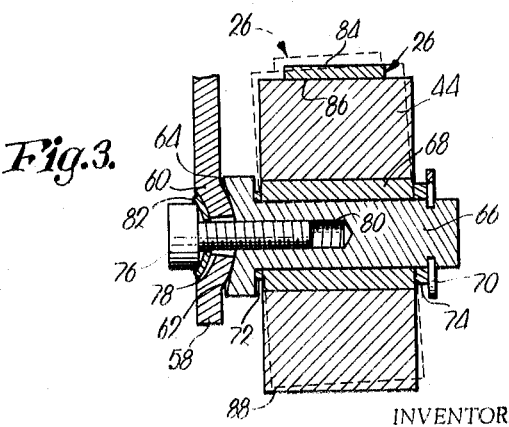

In the drawing:
FIGURE 1 is a fragmentary, elevational view of the deck of a tape recorder, a portion of the deck being broken away to reveal the instant invention in association with the belt and pulley drive of the recorder;

FIG. 2 is an elevational view of the bias compensator of the instant invention showing the same detached from the chassis of the tape recorder, a portion of the mounting arm being shown in section to reveal details of construction; and FIG. 3 is a fragmentary, sectional view taken along line 3—3 of FIG. 1, the head of the fastener being shown in elevation for clarity.

Referring to the figures, the numeral 10 denotes the deck or panel of a tape recording and reproducing instrument revealed fragmentarily in FIG. 1. A pair of tape spools or reels 12 are shown on the deck, the right-hand spool 12 being mounted on a spindle 14. A hood 16 on the deck houses the tape recording and reproducing heads and the various recorder controls (not shown).

Magnetic tape 18 is wound on spools 12 and spans the distance between the latter in the manner as shown in FIG. 1, tape 18 being received by a slot 20 in hood 16, permitting the heads therein to contact the tape.

The central portion of the recorder is cutaway to reveal the recorder chassis 22 having certain components of interest mounted thereon to be described hereinafter. It should be understood that the components on the chassis are shown in simplified form; the remaining components not associated with the instant invention are not revealed.

A drive motor (not shown) within the recorder is coupled with a drive pulley 24. A belt 26 interconnects drive pulley 24 with a driven pulley or flywheel 28. Flywheel 28 is provided with a capstan 30 extending from the hub of the flywheel through the panel 10 and into operative association with tape 18. A pressure roller 32 is shown bearing against tape 18 to hold the same in contact with capstan 30, this position of pressure roller 32 causing tape 18 to be driven by capstan 30 when flywheel 28 is rotated. An idler guide 34 is illustrated for maintaining tape tension, guide 34 extending through an arcuate slot 36 in panel 10. Guide 34 is biased rightwardly as viewed in FIG. 1 to exert the desired pressure on tape 18.

The instant invention is shown at 38 and comprises a mounting member or support 40 swingably attached to chassis 22 by a stud 42, and a rotatable element or roller 44 on the member held in engagement with belt 26 by a spring 46. Spring 46 biases member 40 in a counter-clockwise direction about stud 42 as viewed in FIG. 1.

Referring now particularly to FIGS. 2 and 3, it may be seen that stud 42 includes a threaded portion 48 for mounting device 38 on chassis 22 and a bearing 50 for positioning member 40 and roller 44 in the desired relationship with belt 26. Washer assemblies 52 and 54 maintain end 56 of member 40 on stud 42 for swinging movement of the member about the longitudinal axis of the stud. The other end 58 of member 40 supports roller 44.

The end 58 of member 40 is provided with a protuberance 60 extending toward roller 44. Protuberance 60 presents an arcuate surface 62 which bears against the end 64 of an axle 66. Roller 44 is provided with a bushing 68 which turns on axle 66. Roller 44 is maintained on the axle by a C-washer 70. Spacer washers 72 and 74 bearing against opposed ends of bushing 68 complete the roller and axle assembly.

Arcuate surface 62 is spherical in configuration and forms a convex bearing surface for the end 64 of axle 66. A fastener 76 in the form of a threaded stud bolt extends through a central clearance opening 78 in protuberance 60 and is received by a tapped, axial hole 80 in end 64 of axle 66. A washer 82 is slipped over fastener 76, it being evident that tightening of the fastener secures the axle to end 58 of member 40. It should be noted that end 64 is counterbored to thereby present a frustoconical depression for receiving surface 62. Thus, surface 62 and depression 64 form essentially a ball and socket joint.

Belt 26 has a pair of opposed, outer and inner faces 84 and 86, respectively. Face 86 is, of course, the pulley-engaging face of the belt and is in pressure contact with the cylindrical surface 88 of roller 44.

In the operation of the invention, spring 46 connected to member 40 swings the latter about stud 42 and forces the cylindrical surface 88 of roller 44 into engagement with the inner face 86 of belt 26. Since, as discussed earlier in this specification, belt 26 is not resilient and is longitudinally unattenuatable, the belt will be slightly oversized so as to easily slip over pulleys 24 and 28. Thus, the action of spring 46 serves also to tighten the belt on the pulleys.

The dotted lines in FIG. 3 are exemplary of a position of roller 44 which may be necessary to compensate for the bias of a belt. It may be seen in FIG. 3 that movement of roller 44 from the normal, full-line position to the tilted, dotted line position causes a slight canting or twisting of the belt. This twisting effect offsets the bias of the belt and maintains the latter on the pulleys. Manifestly, roller 44 may be shifted to any one of a number of positions depending on the direction and magnitude of the twisting force required to offset the bias cut of the belt.

As is evident in FIG. 1, the head of fastener 76 may be conveniently disposed for engagement by a wrench or other suitable tool during operation of the recorder. For this purpose, an opening (not shown) may be placed in panel 10 to permit insertion and removal of the wrench. The head of the fastener is preferably adapted for use with a socket wrench or an Allen wrench so that leverage may be applied thereto after loosening of the fastener to move the roller to the desired position against the force of the belt.

Having thus described the invention, what is claimed as new and desired to be secured by Letters Patent is:

1. In combination with a belt and pulley assembly having a continuous belt trained about a pair of spaced pulleys, structure for preventing creepage of the belt axially of the pulleys, said structure comprising:
 a support;
 an axle having opposed ends;
 an element rotatably mounted on said axle and contacting one face of said belt; and
 adjustable means securing one of said ends to said support and providing a cantilever mounting for said axle,
 said adjustable means mounting said axle for movement of the other end thereof along a path of travel to dispose said element at inclinations effecting twisting of said belt in either direction with respect to its longitudinal axis, and including releasable holding means engaging said axle to selectively maintain said element at any one of said inclinations.

2. In combination with a belt and pulley assembly having a continuous belt trained about a pair of spaced pulleys, structure for preventing creepage of the belt axially of the pulleys, said structure comprising:
 a support having a clearance opening;
 an axle having opposed ends;
 an element rotatably mounted on said axle and contacting one face of said belt; and
 adjustable means securing one of said ends to said support with the axle extending therefrom in axial alignment with said opening for tilting movement of said element transversely of the belt,
 said means including a ball and socket joint and an elongated fastener extending through said opening and into said one end axially of said axle, whereby to maintain the element in any one of a number of selected tilted positions to thereby twist the belt transversely thereof at its zone of contact with the element.

3. The invention of claim 2, wherein said one end has a frusto-conical depression therein, said support being provided with a protuberance having a convex surface engaging said one end in said depression, whereby said depression and said surface present said joint.

References Cited by the Examiner
UNITED STATES PATENTS

| | | | |
|---|---|---|---|
| 218,886 | 8/1879 | Klein | 74—240 |
| 2,349,084 | 5/1944 | Findley | 74—240 X |
| 3,101,005 | 8/1963 | Mittag | 74—241 |
| 3,118,314 | 1/1964 | Schuster | 74—241 |
| 3,149,497 | 9/1964 | Haugen | 74—241 |
| 3,156,129 | 11/1964 | Greiner | 74—241 |

DON A. WAITE, *Primary Examiner.*

JAMES A. WONG, *Assistant Examiner.*